United States Patent Office 3,556,771
Patented Jan. 19, 1971

3,556,771
PROCESSES FOR PRODUCING STEEL
Armin M. Bruning, Export, and Serafino M. De Corso, Pittsburgh, Pa., assignors to Westinghouse Electric Corporation, Pittsburgh, Pa., a corporation of Pennsylvania
Filed Oct. 6, 1966, Ser. No. 584,798
Int. Cl. C21c 5/52
U.S. Cl. 75—12                                        8 Claims

ABSTRACT OF THE DISCLOSURE

A nonconsumable electrode having a fluid cooled arcing surface and magnetic field generating means for exerting a force on an arc between electrode and melt and causing the arc to move in generally repetitive paths on the electrode and on the melt, with means for adjusting the power of the arc, is used in processes for producing steel providing greater electrical heating efficiency and less contamination by material lost from the electrode. Another process includes supplying heat from the electrode to prevent heat loss and permit a holding operation. The processes include supplying oxygen to a melt to oxidize impurities, either by a separate oxygen lance or by utilizing an electrode having an axially extending passageway therethrough for bringing oxygen. Our improved processes include all essential steps in making steel, or improved performance in individual steps.

This invention relates to improvements in steel making and more particularly to processes employing an improved furnace for making steel by the oxygen lance process and employing a nonconsumable electrode to supply heat independent of oxygen introduction.

Basic oxygen steel furnaces are rapidly replacing the open-hearth furnace in steel making. However, the basic oxygen furnaces have two major limitations, both of which are overcome by our invention. These limitations are that the amount of scrap that can be charged with molten pig iron into the basic oxygen furnace is limited, a maximum figure being about 25% scrap. This is because the heating effect and time of carbon-oxygen reaction must balance or exceed heat capacity in time to melt scrap. The second limitation of prior art basic oxygen furnaces is that the furnace cannot be a holding station, which means certain unavoidable fluctuation in the production process downstream of the basic oxygen furnace, which is expensive.

In summary, the processes of our invention may employ a basic oxygen furnace with a nonconsumable electrode or electrodes added as a source of heat independent of oxygen introduction. According to one embodiment of apparatus suitable for practicing our invention, an oxygen lance and a separate nonconsumable electrode or electrodes are used. According to another embodiment of our invention, the internal, axial passageway of the electrode is used for oxygen injection, that is, the oxygen lance and the nonconsumable electrode are one and the same.

By using a nonconsumable electrode we provide a new process and a new device for steel making. Our process and device remove the two major limitations cited hereinabove, and in particular makes it possible to charge variable and large proportions of scrap into the furnace.

Accordingly a primary object of our invention is to provide a new and improved process for making steel.

Another object is to provide a process in which a holding operation may be included.

Another object is to provide a new and improved steelmaking process employing a nonconsumable fluid-cooled arc-moving electrode and an oxygen lance.

A further object of our invention is to provide a new and improved process employing a nonconsumable fluid-cooled arc-moving electrode having an axial passageway extending therethrough through which oxygen is fed into the furnace, in effect performing all the functions of an oxygen lance.

Figure 1:
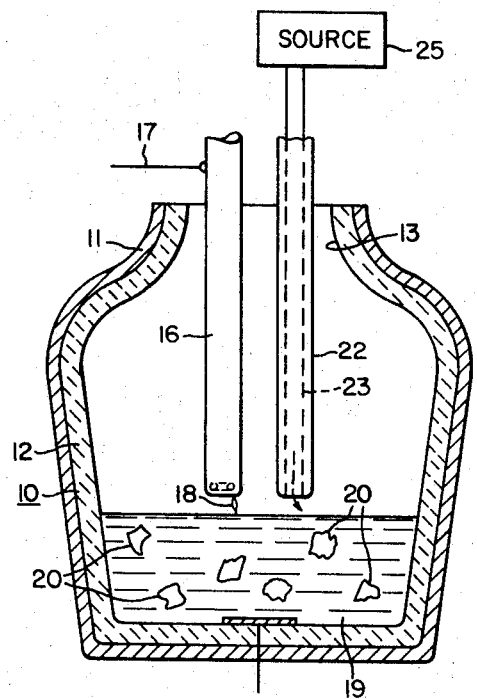
Figure 2:
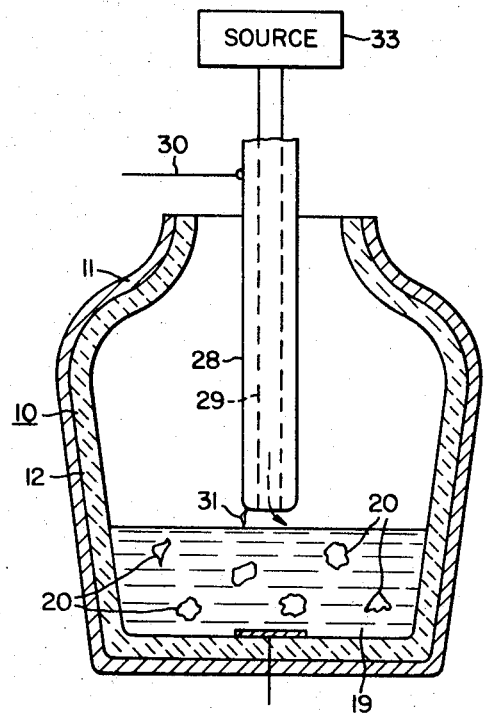

These and other objects will become more clearly apparent after a study of the following specification, when read in connection with the accompanying drawings, in which:

FIG. 1 illustrates apparatus suitable for practicing the process of our invention; and FIG. 2 illustrates other apparatus suitable for practicing another process of our invention.

Referring now to the drawings for a more detailed understanding of the invention, and more particularly to FIG. 1 thereof, a furnace is shown and generally designated 10. For simplicity of illustration the furnace generally designated 10 is shown as having a wall and bottom with an outer metallic lining or portion 11 and an inner refractory portion 12, but it should be understood that in accordance with practices well known in the art, the wall structure of the furnace could be any desired structure. The furnace 10 is shown as being of a shape resembling somewhat the blast box which is utilized in the Bessemer steel making process, but it should be understood that the shape of the furnace may be any desired shape. For simplicity of illustration, it is understood that any convenient means may be employed for obtaining the melt from the furnace, as by a tap in the bottom of the furnace, a spout at some position along the vertical dimension of the furnace, or the trunnion which supports the blast box may be turnd so that the steel may be poured from the top 13 of the furnace.

Extending through the opening 13 in the top of the furnace is a nonconsumable electrode generally designated 16, having means symbolized by the lead 17 for connecting the electrode to a source of potential to produce the arc 18 between the electrode and a melt 19 including scrap portions 20. The electrode 16 may be similar to that described and claimed in the copending application of Armin M. Burning for "Nonconsumable Electrode for Electric Arc Heating and Melting and Methods," Ser. No. 866,274, filed Oct. 14, 1969, which application is a continuation-in-part of an application for "Electric Arc Furnace and Suitable Nonconsumable Electrode for Use Therein," Ser. No. 407,332, filed Oct. 29, 1964, now abandoned, both assigned to the assignee of the instant invention. In essence, the nonconsumable electrode 16 includes means forming an arcing surface adjacent the melt, and the electrode 16 further includes a magnetic field coil disposed therein in a position to cause the arc from the arcing surface to rotate. The arc rotates at a preselected speed in accordance with the teachings of the aforementioned copending patent application. In addition, a cooling fluid is brought into the electrode 16 for cooling the shank or body portion of the electrode, and the cooling fluid also flows through passageways in the electrode tip, conducting heat flux from the tip and arcing surface and preventing a burn-through by the intensely hot arc spot.

An oxygen lance is generally designated 22, which may be composed of any suitable material which will withstand the intensely high temperature of the furnace, for example, tungsten, the oxygen lance having a passageway 23 extending therethrough, through which substantially pure oxygen, $O_2$ from source 25 is added to the melt in the furnace.

Generally speaking, steel is a purified alloy of iron-carbon and other elements. In the past steel has been made from pig iron chiefly by the open hearth process and by the Bessemer process. In both of these processes scrap steel may be part of the melt. For example, open hearth steel is made in a reverberatory furnace; the flame is reflected by the roof onto the material to be heated. Cast iron is melted with scrap steel and some hematite or iron oxide, $Fe_2O_3$, and the furnace is heated with gas or fuel. The fuel and air preheated by passage through a network of hot brick on one side of the furnace and a similar network on the other side is heated by the hot outgoing gases. The direction of flow of gas may be periodically reversed. The carbon and other impurities in the molten iron are oxidized by the hematite and by excess air in the furnace gas. Anaylses are made during the run, and when almost all the carbon is oxidized, the amount of carbon desired for the steel is added, as coke, or as a high carbon alloy, usually ferromanganese. The molten steel may be then cast into billets.

In the Bessemer process compressed air is supplied to the blast box through a trunnion; the compressed air bubbles through the molten iron and oxidizes the carbon and silicon. In about 10 minutes the reaction is nearly complete; a high carbon alloy is then added and the steel is poured.

A further discussion of the chemical processes occurring in the manufacture of steel may be had by reference to a work entitled "General Chemistry" by Linus Pauling, Freeman and Company, 1947, and to the "Encyclopedia of Chemical Technology," Interscience, 1952, vol. 8.

Common to both of the aforedescribed processes is the oxidation of the carbon and silicon in the iron. The oxygen lance process similar to that illustrated in FIG. 1, also called a basic oxygen furnace, results in a more rapid oxidation for the impurities in the melt because of the purity of the oxygen supplied to the melt. Basically the same chemical processes occur but at a more rapid rate.

By utilizing a nonconsumable electrode and an oxygen lance which preferably is retractable as shown in FIG. 1, we overcome one limitation of the prior art basic oxygen furnaces, that is, the amount of scrap that can be charged with molten pig iron into the basic oxygen furnace is limited, and this because the heating effect and time of the carbon-oxygen reaction must balance or exceed heat capacity in time to melt scrap. By utilizing a separate nonconsumable electrode to add additional controllable heat, and it is understood that the power of the arc 18 may be controlled at will by suitable apparatus (not shown for convenience of illustration), the total heat added by the electrode and the heating effect and time duration of the carbon oxygen-reaction can easily exceed the heat capacity in time to melt scrap, so that the amount of scrap can be substantially increased without destroying this basic balance or relationship.

In summary our process according to FIG. 1 includes the steps of forming a melt composed of iron and scrap, supplying oxygen to the melt to produce at least a certain heating effect over a certain period of time, and utilizing a nonconsumable electrode, to add additional heat to the melt, the total heat produced by the nonconsumable electrode and the carbon-oxygen reaction balancing or exceeding the heat capacity in time to melt scrap.

Particular reference is made now to FIG. 2. As in FIG. 1, a furnace generally designated 10 has a metal wall portion 11 and an inner refractory wall portion 12, and the melt 19 as before has scrap portions 20. The nonconsumable electrode 28 in addition to having the features described in connection with the electrode 16 of FIG. 1 has a central passageway 29 extending the entire length thereof, and the electrode is connected by means symbolized by lead 30 to a source of potential to produce the arc 31 to the melt 19. Oxygen $O_2$ is supplied from source 33 to the melt through the central passageway 29 in the electrode, so that the electrode 28 in addition to forming a nonconsumable electrode and producing the arc 31 to the melt, also serves as an oxygen lance, bringing oxygen to the melt through the central passageway 29.

The electrode 28 is not part of the subject invention. A suitable electrode is described and claimed in the copending patent application of S. M. DeCorso for 'Electrode," Ser. No. 479,965, filed Aug. 16, 1965, now issued Pat. No. 3,369,067, and assigned to the assignee of the instant invention.

A method of making steel according to FIG. 2 includes the steps of producing a melt of iron and scrap, disposing a nonconsumable electrode having an axial passageway extending therethrough near the melt, attaching the electrode to the source of potential to produce an arc between the electrode and the melt, and supplying oxygen to the melt through the passageway axially extending through the electrode. It will be readily understood that the nonconsumable electrode 28 is fluid cooled, and may have in addition heat shield means composed of ceramics or other insulating materials to permit the electrode to have a useful life of many days even in the intense heat of radiation and convection within the furnace.

Electrodes 16 and 28, FIGS. 1 and 2, may if desired produce their arcs to another electrode disposed within the furnace rather than to the melt itself.

Whereas we have described two processes for producing steel according to our invention, and have shown and described two furnace arrangements, also part of our invention, for practicing the processes, it should be understood that the drawings and the written description are illustrative only and should not be interpreted in a limiting sense.

We claim as our invention:

1. An improved process for producing steel of the type in which material is heated by an arc from an electrode to the material comprising the steps of adding iron and scrap steel in a furnace, utilizing a nonconsumable electrode having a fluid cooled arcing surface spaced from the material and a magnetic field substantially continuously moved arc to heat the iron and steel scrap to a predetermined temperature and form a melt, the arcing surface of the electrode being spaced from any slag formed on the surface of the melt and providing increased heating efficiency and heating without substantially contaminating the melt by material lost from the electrode, supplying oxygen to the melt in the furnace to oxidize carbon, silicon and other impurities, and adding carboniferous material to produce steel.

2. A process according to claim 1 wherein an oxygen lance is employed for adding oxygen to the melt.

3. A process according to claim 1 wherein the nonconsumable electrode is additionally characterized as having an axially extending passageway therethrough and oxygen is brought to the melt through said passageway.

4. A process according to claim 1 in which said predetermined temperature is at least equal to the temperature at which the addition of oxygen to the melt initiates an exothermic reaction, the exothermic reaction producing a further increase in the temperature of the melt.

5. In a process for producing steel including the steps of heating the raw material or materials by an electric arc to the material to form a melt, introducing oxygen to remove impurities from the melt, and thereafter adding carbon to produce steel, the improvement which includes in the first-named step utilizing an electrode having a fluid cooled arcing surface spaced from the material and spaced from any slag formed on the surface of the melt with a magnetic field substantially continuously moved arc therefrom to provide increased heating efficiency by enlarging the area of the surface of the melt coming into direct contact with the arc while at the same time avoiding contamination of the melt by material lost from the electrode.

6. A process according to claim 5 wherein only enough heat is supplied by the arc to bring the melt to a temperature at which the addition of oxygen initiates an exothermic reaction, and thereafter extinguishing the arc.

7. In a steel producing process of the type in which at least two furnaces are employed to reduce the raw material to a melt, add oxygen to the melt to remove impurities therefrom, and thereafter add carbon to produce steel, the improvement which includes using during at least one of the first and second named steps an electrode having a fluid cooled arcing surface spaced from the material and spaced from any slag formed on the surface of the melt to produce an electric arc between electrode and material, the electrode having magnetic field generating means therein to produce a field which exerts a force on the arc which causes the arc to move substantially continuously over the arcing surface, and adjusting the power to the arc whereby the arc supplies only that amount of heat necessary to maintain a given temperature and permit a holding operation.

8. A process including the steps of forming a melt composed of iron and scrap, supplying oxygen to the melt to produce by a carbon-oxygen reaction at least a certain heating effect over a certain period of time, and utilizing a nonconsumable electrode having a fluid cooled arcing surface spaced from the melt and spaced from any slag formed on the surface of the melt and a magnetic field substantially continuously moved arc between electrode and melt to efficiently further heat the melt without contaminating the melt by material lost from the electrode, the total heat produced by the nonconsumable electrode and the carbon-oxygen reaction balancing or exceeding the heat capacity in time to melt scrap.

References Cited
UNITED STATES PATENTS

| | | | |
|---|---|---|---|
| 3,163,521 | 12/1964 | Rinesch | 75—12X |
| 3,385,494 | 5/1968 | Themelis | 75—10 |
| 3,194,941 | 7/1965 | Baird | 219—121 |
| 3,198,624 | 8/1965 | Bell et al. | 75—130.5X |
| 3,336,132 | 8/1967 | McCoy | 75—60X |
| 3,369,067 | 2/1968 | DeCorso | 13—18 |

L. DEWAYNE RUTLEDGE, Primary Examiner

J. E. LEGRU, Assistant Examiner

U.S. Cl. X.R.

13—18; 75—10, 49, 129; 219—121